United States Patent [19]
Ament et al.

[11] Patent Number: 4,596,221
[45] Date of Patent: Jun. 24, 1986

[54] TRANSIENT INJECTION TIMING CONTROL

[75] Inventors: Frank Ament, Rochester; Richard A. Peden, Livonia, both of Mich.

[73] Assignee: General Motors Corporation, Detroit, Mich.

[21] Appl. No.: 748,405

[22] Filed: Jun. 24, 1985

[51] Int. Cl.⁴ ............................................ F02M 59/20
[52] U.S. Cl. .................................................. 123/501
[58] Field of Search ............... 123/501, 502, 357, 492

[56] References Cited

U.S. PATENT DOCUMENTS

| | | | |
|---|---|---|---|
| 4,351,283 | 9/1982 | Ament | 123/460 |
| 4,368,705 | 1/1983 | Stevenson et al. | 123/501 |
| 4,388,909 | 6/1983 | Ogasawara et al. | 123/501 |
| 4,450,817 | 5/1984 | Wuki et al. | 123/501 |
| 4,503,830 | 3/1985 | Nakamura et al. | 123/501 |

OTHER PUBLICATIONS

Murayama et al., SAE Paper No. 800966, "Combustion Behaviors Under Accelerating Operation of an IDI Diesel Engine", 1980.
Trenne et al., SAE Paper No. 820,447, "Closed Loop Design for Electronic Diesel Injection Systems".
Reams et al., SAE Paper No. 820,449, "Capabilities of Diesel Electronic Fuel Control".
MTZ Motortechnische Zeitschrift 36 (1975) 4, pp. 111–115, "Beitrag zum Emissionsverhalten von Dieselmotoren bei Instationarem Betrieb".

*Primary Examiner*—Magdalen Y. C. Greenlief
*Attorney, Agent, or Firm*—Mark A. Navarre

[57] ABSTRACT

The timing of the injection of fuel to the cylinders of a diesel engine is normally determined in accordance timing values obtained from an empirically derived steady state timing schedule but is modified during transient engine operation by an amount determined in accordance with the cylinder-to-cylinder change in requested fuel amount. In light to moderate engine acceleration, the steady state timing value is modified by a correction amount which serves to retard the start of injection for effecting a reduction in engine noise and exhaust emissions. In periods of heavy engine acceleration, the steady state timing value is modified by a correction amount which serves to advance the start of injection to improve the engine performance. When the cylinder-to-cylinder change in requested fuel quantity indicates a return to substantially steady state engine operation, the correction amount is reduced in relation to the correction amount magnitude and the cylinder firing frequency.

7 Claims, 17 Drawing Figures

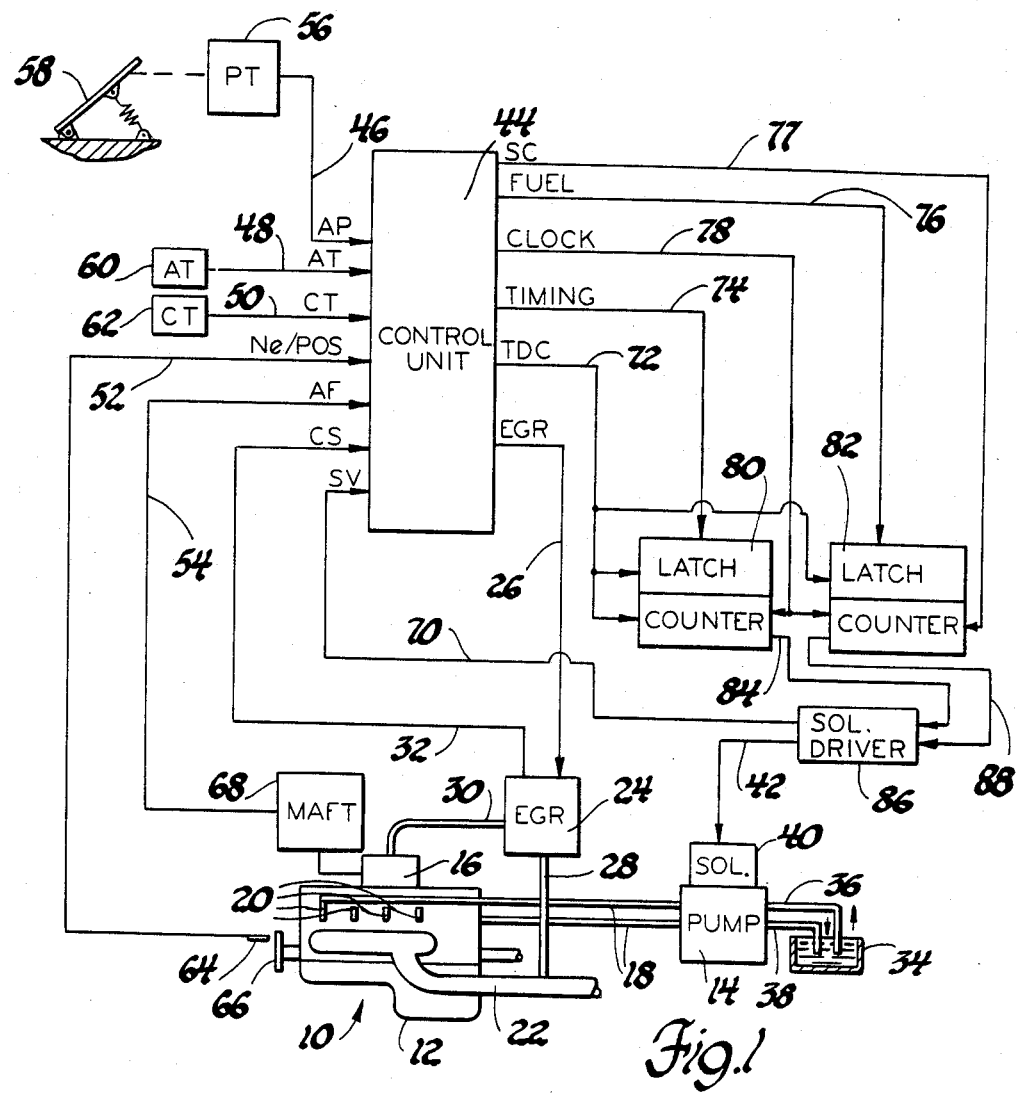
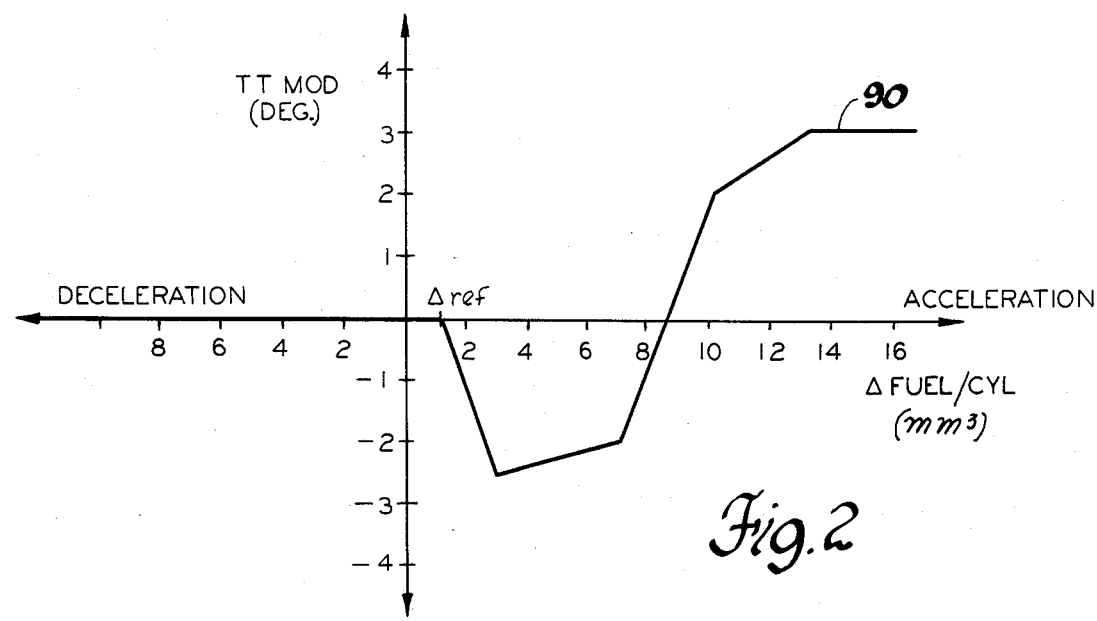
Fig.1
Fig.2

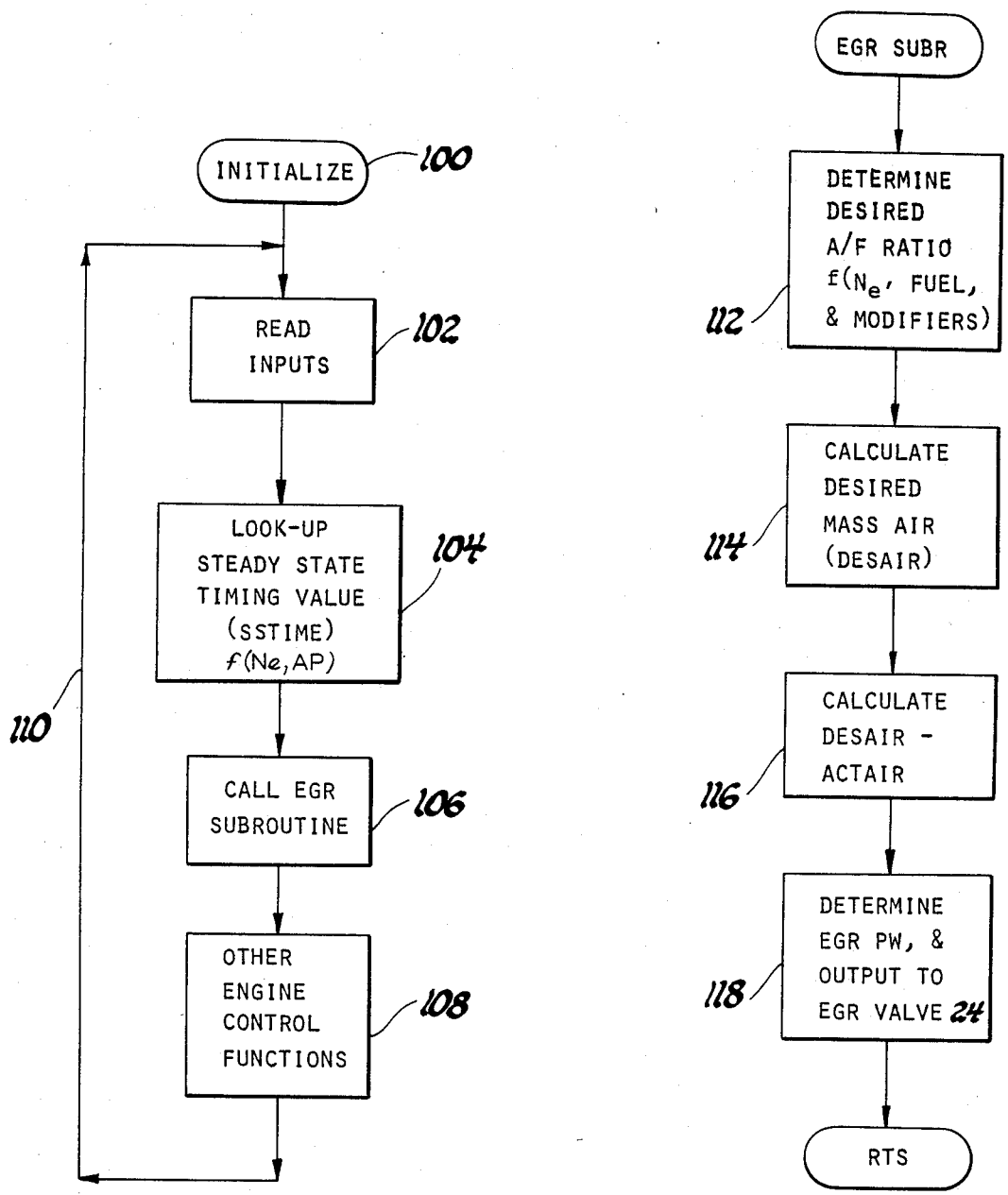

TRANSIENT INJECTION TIMING CONTROL

This invention relates to diesel engine fuel injection timing control and more particularly to an arrangement for effecting a modification of steady state derived injection timing control during transient engine operation.

In diesel engine control, the fuel injection timing is generally tailored to minimize noise and regulated exhaust emissions while maximizing fuel economy and power. The optimum timing for a particular family of engines is empirically determined by operating representative engines under steady state conditions in a dynamometer test cell and compiling a schedule of timing values for various combinations of engine speed and engine load which best satisfy the noise, emissions, economy and power criteria.

In passenger car applications, diesel engines experience transient as well as steady state operating conditions. In this respect, it is generally known that the optimum timing values for transient engine operation are somewhat different than for steady state engine operation. If the timing control is operated in accordance with an empirically derived steady state schedule, the exhaust emissions, noise and power levels in transient operation will be different from those which occur under steady state operation. The primary reason for the difference in timing value requirement under transient engine operation is that the combustion chamber conditions (cylinder wall temperature and charge composition, in particular) have not stabilized. During an acceleration, for example, the cylinder wall temperature is cooler for a given speed and load condition than it would be under steady state operation; the reverse is true for deceleration. Since the cylinder wall temperature and charge composition directly affect the evaporation and precombustion reactions of the fuel, the timing value empirically determined under steady state engine operation may be inappropriate.

Notwithstanding the above, it has been difficult in the past to implement a different timing schedule during transient engine operation because the timing controls have not had sufficiently fast speed of response. The cylinder wall temperature instability has its main impact on the engine cylinder firings at the beginning of a transient. By the time the typical timing control mechanism could be adjusted to a suitable transient value, steady state engine operation would have resumed. However, increasingly stringent exhaust emission regulations have spurred the development of electrical timing controls, and currently the control technology has advanced to the point where the start and stop of each injection of fuel can be precisely controlled. In other words, it is now possible to accurately control both the fuel quantity and time of injection for each engine cylinder firing event based on current engine operating conditions.

The present invention is directed toward an arrangement for modifying the empirically derived steady state timing schedule on a cylinder-to-cylinder basis by a correction amount determined by the extent to which the demanded engine operation deviates from steady state engine operation. It is broadly recognized herein that the rate of change in combustion chamber conditions experienced during transient engine operation (and hence the different timing requirement) is related to the cylinder firing frequency, and that the modification of the steady state derived timing values should thus be updated on a cylinder-by-cylinder basis.

It is therefore the general object of this invention to provide an improved diesel engine fuel control system having an empirically determined steady state timing schedule wherein the timing values obtained from the timing schedule are modified by a correction amount updated on a cylinder-by-cylinder basis in relation to an indication of the extent to which the demanded engine operation deviates from steady state operation, and wherein the correction amount is removed at a rate determined in relation to the cylinder firing frequency when the engine returns to substantially steady state operation.

A more specific object of the invention is to provide a control arrangement as set forth above wherein the extent to which the demanded engine operation deviates from steady state engine operation is determined in relation to the cylinder-to-cylinder change in requested fuel quantity.

A further object of this invention is to provide a control arrangement as set forth above wherein the correction amount under relatively heavy engine acceleration serves to advance the timing value relative to the timing value from the steady state schedule to compensate for the ignition delays normally experienced under such conditions, thereby increasing the engine power output, and wherein the correction amount under light to moderate engine accelerations serves to retard the injection timing relative to the timing value from the steady state schedule, thereby decreasing the levels of engine noise and certain exhaust emissions normally experienced under such conditions. The retard correction may be eliminated or appropriately modified under engine operating conditions where drivability and/or performance take precedence.

The above objects are carried forward with a solenoid spill fuel injection pump of the type referred to in the U.S. Pat. No. 4,351,283 to Ament issued Sept. 28, 1982, and assigned to the assignee of the present invention. In such pump, the plungers which deliver fuel to the individual cylinders are normally supplied with an excess quantity of fuel from the fuel reservoir, and the pressurized fuel delivered during a pump stroke of the plunger is either injected into a cylinder or spilled via a return passage to the fuel reservoir. A solenoid valve controls the opening and closing of the spill passage such that fuel injection is initiated in a pump stroke when the spill passage is closed and terminated in the same pump stroke when the spill passage is subsequently opened.

Electronically, the fuel control system includes a control unit effective for each cylinder firing event to output a fuel value indicative of the desired fuel quantity for the respective cylinder based on operator demand, and a timing value indicative of the point in the engine cycle at which supply of the fuel should be initiated. The timing value is obtained from a timing schedule comprising a compilation of timing data empirically derived during steady state engine operation. In addition, the electronic portion of the control system includes solenoid timer and driver means responsive to the fuel value and timing value outputted by the control unit for electrically controlling the solenoid spill valve of the fuel pump so as to initiate the supply of fuel at the point in the engine cycle indicated by the timing value and to terminate the supply of fuel at a later point determined in relation to the fuel value. Timing values obtained from the empirically derived steady state timing schedule are modified by a correction amount which accounts, at least in part, for the fuel timing requirement differences occasioned by transient engine operation so that the timing value outputted by the control unit yields an improvement in the resulting engine exhaust emissions, noise, power or economy. The correction amount is determined in relation to the cylinder-to-cylinder change in fuel value determined by the control unit and the correction amount is updated on a cylinder-by-cylinder basis so long as the transient operation persists. When the cylinder-to-cylinder change in fuel value indicates a return to substantially steady state engine operation, the correction amount is reduced or phased out at a rate determined in relation to the magnitude and direction of the transient and the cylinder firing frequency.

In the illustrated embodiment, the correction amount retards the start of fuel injection when the change in requested fuel amount indicates light to moderate acceleration demand, and advances the start of fuel injection when the change in requested fuel amount indicates heavy acceleration demand. As a result, noise and certain exhaust emissions are reduced during light to moderate acceleration, and engine performance is improved during heavy acceleration. In light to moderate acceleration, the timing retard permits reduced usage of exhaust gas recirculation (EGR) for emission control, and thereby reduces exhaust gas soot and engine oil contamination. At the initiation of a light to moderate acceleration, the timing retard may be delayed until EGR is at least partially cut off so that the emission reduction is attained when it is needed the most.

In the Drawings:

FIG. 1 is a block diagram of a computerized diesel engine fuel control system for carrying out the control functions of this invention.

FIG. 2 is a graph depicting the initial timing correction amount as a function of the cylinder-to-cylinder change in requested fuel amount.

Figure 5A:
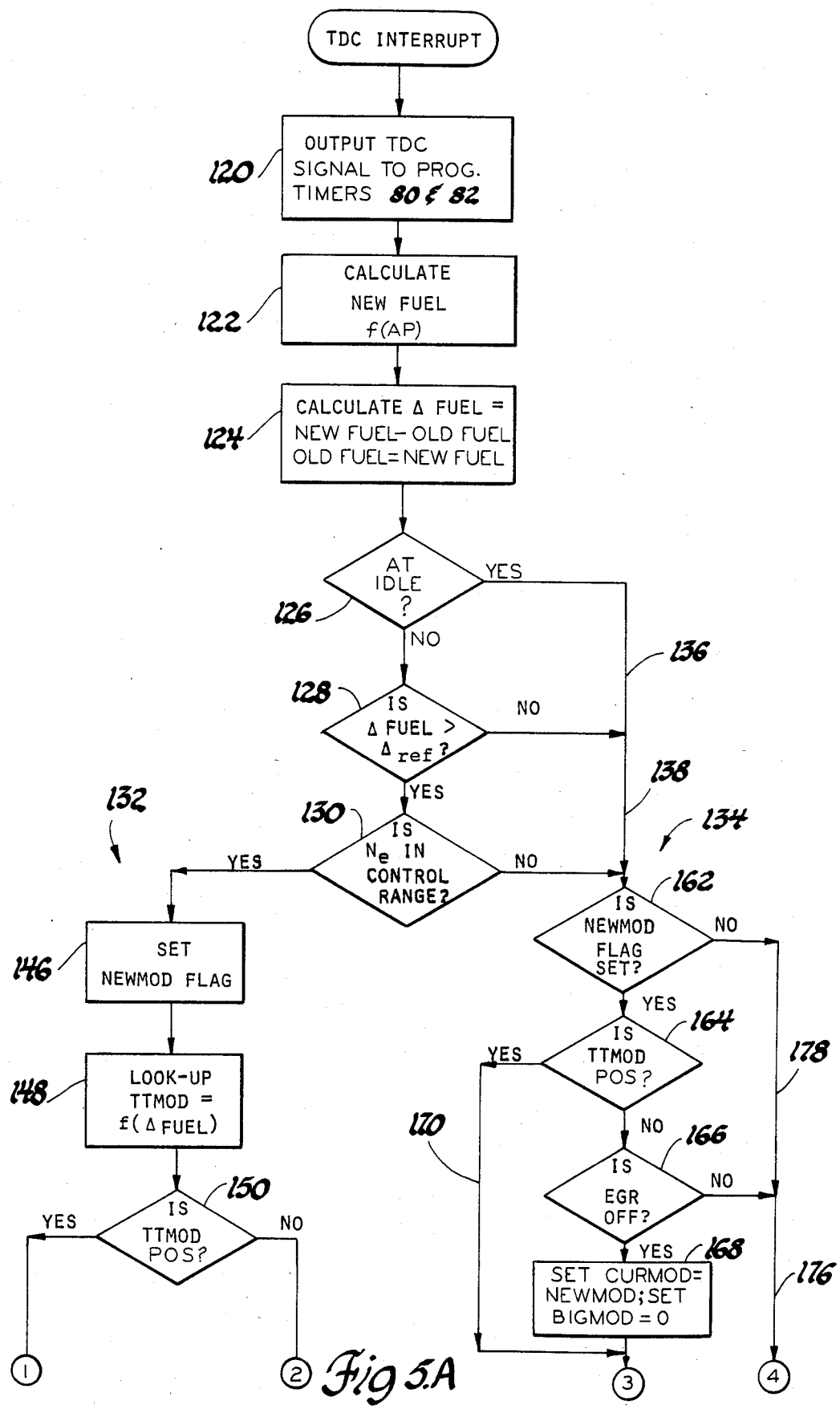

FIGS. 3–5A and 5B flow diagrams representative of program instructions executed by the computerized fuel control system of FIG. 1 in carrying out the control functions of this invention.

FIGS. 6A–6E and 7A–7F are graphs describing the operation of the fuel control system of FIG. 1 according to this invention.

Referring now more particularly to FIG. 1, reference numeral 10 generally designates a portion of a motor vehicle power plant comprising a diesel engine 12 and a solenoid operated fuel pump 14. The engine 12 draws combustion air at atmospheric pressure for each cylinder through an intake manifold 16, and the fuel for the various engine cylinders is supplied by the pump 14 via the fuel lines 18 and a plurality of individual fuel injectors 20. Although only two fuel lines 18 are shown, it will be understood that the pump 14 supplies fuel to each injector 20 via a separate line 18. Following combustion, exhaust gases from the various engine cylinders is conducted away from the engine 12 by the exhaust manifold and pipe assembly 22. For the purpose of controlling exhaust gas emission, an electrically operated exhaust gas recirculation (EGR) valve 24 is controllable via the line 26 to return a portion of the exhaust gases from the exhaust pipe 22 to the intake manifold 16 via the lines 28 and 30. Also included (but not shown) within the EGR valve 24, is a switch for providing an electrical signal on line 32 when the EGR valve is substantially closed—that is, when substantially no exhaust gas is being returned to the intake manifold 16. The fuel pump 14 is driven by the engine 12 and continuously circulates fuel from a fuel reservoir 34 through individual passages within the pump 14 via the supply and return lines 36 and 38. Thus, the plungers (not shown) in pump 14 which deliver fuel to the individual engine cylinders are supplied with an excess quantity of fuel from the reservoir 34 via the supply line 36, and the pressurized fuel delivered during a pump stroke of a respective plunger is either injected into an engine cylinder via a line 18 or spilled via the return line 38 to the fuel reservoir 34. A plunger type solenoid 40 energizable via the line 42 controls a valve for opening and closing the return line 38 such that fuel injection is initiated in a pump stroke when the return line 38 is closed, and terminated in the same stroke when the return line 38 is subsequently opened. As indicated above, a pump and solenoid valve assembly of this type is disclosed in more detail in the above mentioned U.S. Pat. No. 4,351,283 to Ament, incorporated herein by reference.

The reference numeral 44 desgnates a computerized control unit for controlling the operation of the EGR valve 24 and the fuel pump solenoid 40 in response to a number of sensed inputs according to a predetermined control algorithm. The control unit 44 thus includes an input/output circuitry for receiving and outputting the various input and control signals, and a microcomputer for processing the input signals and carrying out the control algorithm. Design details of such circuits and devices are well known to those skilled in the art of electronic controls, and are therefore not presented herein. The inputs for control unit 44 include an accelerator pedal position signal (AP) on line 46, an air temperature signal (AT) on line 48, an engine coolant temperature signal (CT) on line 50, an engine speed/crank position signal ($N_e$/POS) on line 52, a mass air flow signal (AF) on line 54, and an EGR closure signal (CS) on line 32. The above input signals are each obtained with conventional transducers which are only schematically illustrated in FIG. 1. Thus, the accelerator pedal position signal (AP) on line 46 is obtained with a position transducer (PT) 56 such as a rotary potentiometer mechanically connected to an operator manipulated accelerator pedal 58; the air temperature and coolant temperature signals (AT, CT) on lines 48 and 50 are obtained with conventional temperature transducers 60 and 62; the engine speed/crank position signal ($N_e$/POS) on line 52 is obtained with a variable reluctance or similar transducer 64 responsive to the passage of teeth formed on an engine pulley or flywheel 66 that rotates with the engine crankshaft; and the mass air flow signal (AF) on line 54 is obtained from a hot wire or other conventional air flow transducer 68. As indicated above, the EGR valve closure signal (CS) on line 32 is obtained from a switch (not shown) within the EGR valve assembly 24, which senses substantial closure of the valve between the lines 28 and 30. A further input signal (SV) for the control unit 44 is provided on line 70 to indicate closure of the solenoid operated spill valve of pump 14 so that the beginning of supply of fuel to the respective engine cylinders is precisely known. Such signal may be obtained, as is generally known in the art of solenoid control, by monitoring the solenoid voltage and detecting the abrupt voltage rise due to the inductance change upon closure of the valve.

The primary outputs of the control unit 44 comprise the EGR signal on line 26 for controlling the operation of the EGR valve 24, the TDC signal on line 72, the TIMING signal on line 74, and the FUEL signal on line 76. Also provided is a spill valve closure signal SC on line 77 and an engine speed related CLOCK signal on line 78. The SC output signal on line 77 is derived from the solenoid voltage input SV on line 70 as described above and becomes active whenever closure of the spill valve of pump 14 is detected. The CLOCK signal on line 78 may be developed directly by the control unit 44 or by an external hardware circuit such as a phase-locked loop, and essentially comprises a series of relatively high frequency pulses developed in synchronism with the engine speed/crank position signal ($N_e$/POS) on line 52, but at a multiple frequency thereof. The development of the EGR signal on line 26 is described in more detail hereinafter in reference to FIG. 4 and the development of the FUEL, TIMING and TDC signals are described in more detail hereinafter in reference to FIGS. 3 and 5.

As explained below, the TDC, CLOCK and SC signals are used in conjunction with the FUEL and TIMING signals to develop an energization pulse for the fuel pump solenoid 40 on line 42 for effecting the injection of fuel into the various cylinders of engine 12. The initiation of the fuel supply is determined from the TIMING signal and the duration of the fuel supply is determined from the FUEL signal. More specifically, the above signals are applied to the programmable timers generally designated by the reference numerals 80 and 82. Each of the programmable timers 80 and 82 comprises a latch, or register, and a downcounter. Digital information stored in the latch may be gated or transferred into the downcounter and decremented at a desired clock frequency. When the count in the downcounter is decremented to zero, the counter issues an output signal which is used to gate or trigger another device. In the illustrated embodiment, the TIMING signal on line 74 is applied to the latch of programmable timer 80 and the FUEL signal on line 76 is applied to the latch of programmable timer 82. The CLOCK signal on line 78 is applied to the clock inputs of both programmable timers 80 and 82. The TDC signal on line 72 is applied to the latch gate input of both programmable timers 80 and 82 and to the count enable input of the programmable timer 80.

In operation, TIMING and FUEL signals outputted from the control unit 44 on lines 74 and 76 are stored in the latch of the programmable timers 80 and 82. When the control unit 44 issues a TDC signal on line 72, the TIMING and FUEL signals stored in the latches are transferred to the respective downcounters, and the count in the counter of programmable timer 80 is decremented at the frequency of the CLOCK signal on line 78. When the count is decremented to zero an output pulse is issued on line 84 which signals a solenoid driver 86 to begin energization of the fuel pump solenoid 40 for initiating the supply of fuel to engine 12. However, a finite period of time is required for the spill valve to close, and decrementing of the count stored in programmable timer 82 is only enabled when the SC signal on line 77 becomes active. When the count stored in the counter of programmable timer 82 is decremented to zero, an output pulse is issued on line 88 which signals the solenoid driver 86 to terminate the energization of the fuel pump solenoid 40 for terminating the supply of fuel to engine 12. In such mechanization, it will be recognized that the information contained in the TIMING signal on line 74 is actually representative of the time delay from top dead center (TDC) to start of injection for a respective engine cylinder.

The control unit 44 develops the FUEL signal primarily as a function of operator demand as determined by the accelerator pedal position signal (AP), and the TIMING signal, in turn, is determined as a function of the desired fuel quantity and engine speed ($N_e$). More particularly, the TIMING signal is formed as a combined function of an empirically derived steady state timing value SSTIME and a correction amount CURMOD which accounts, at least in part, for timing requirement differences occasioned by transient engine operation. The correction amount is determined in relation to the cylinder-to-cylinder change in requested fuel quantity and is updated on a cylinder-by-cylinder basis so long as the transient operation persists. When the change in requested fuel quantity indicates light to moderate acceleration demand, the correction amount serves to retard the start of fuel injection to decrease the levels of certain exhaust emissions and noise. When the change in requested fuel quantity indicates heavy acceleration demand, the correction amount serves to advance the start of fuel injection to improve engine performance. When the cylinder-to-cylinder change in fuel quantity indicates a return to substantially steady state engine operation, the correction amount is reduced or phased out at a rate determined in relation to the cylinder firing frequency, and the magnitude and direction of the transient.

The initial timing correction as a function of the cylinder-to-cylinder change in requested fuel quantity is graphically depicted in FIG. 2 by the trace 90. In such representation, the timing correction is given in degrees, a positive correction indicating an advance of the start of injection and a negative correction indicating a retard of the start of injection. The cylinder-to-cylinder change in fuel quantity is given in $mm^3$ and is defined such that a positive change indicates acceleration demand and a negative change indicates deceleration demand. The trace 90 represents the illustrated embodiment wherein light to moderate acceleration demand is indicated by a cylinder-to-cylinder change in requested fuel quantity of about 1.2–8.8 $mm^3$, while heavy acceleration demand is indicated by a cylinder-to-cylinder change in requested fuel quantity of about 8.8 $mm^3$ or larger. During heavy acceleration demand, the correction amount can effect an advance of the injection timing by up to approximately 3.0 degrees of crankshaft rotation; during light to moderate acceleration the correction amount can effect a retard of the injection timing by up to approximately 2.6 degrees of crankshaft rotation FIGS. 3–5 depict flow diagrams representative of program instructions executed by the control unit 44 for controlling the supply of engine fuel in accordance with the teachings of this invention. FIG. 3 shows a main program periodically executed to read the various input values, control the operation of the EGR valve 24 and determine a steady state timing value (SSTIME) from an empirically derived steady state timing schedule. FIG. 4 sets forth the EGR control of the main program in more detail. FIG. 5 shows an interrupt routine which is executed in response to the passage of each engine piston through its top dead center (TDC) position (as determined from the engine speed/crank position signal $N_e$/POS) and which operates to output FUEL and TIMING signals for upcoming engine cylinder firing events.

Referring now more particularly to FIGS. 3 and 4, the reference numeral 100 designates a series of program instructions for initializing the various input values, registers, timers, etc., within the control unit 44. Such instructions are executed at the initiation of each period of vehicle operation and serve to ensure repeatable and reliable operation of the control unit 44. Following such initialization procedures, the instruction block 102 is executed to read and process information associated with the various input signals identified in FIG. 1. While most of the information is in the required form and is simply stored for later use, certain information, including the engine speed/crank position signal $N_e$/POS on line 52 and the solenoid voltage signal SV on line 70 is processed to provide the desired information. Thus, the engine speed/crank position signal is processed to identify both the engine speed $N_e$ and the occurrence of each TDC, and the solenoid voltage signal is processed as indicated above to identify substantial closure of the fuel pump spill valve. Thereafter, the instruction block 104 is executed to determine a timing value SSTIME based on empirically derived timing data compiled during engine testing under steady state engine speed and load conditions. As indicated above, such data is compiled in a dynamometer test cell and timing values are chosen which best satisfy noise, emission, economy and power criteria for the particular steady state conditions under test. Thus, the steady state timing value SSTIME determined at instruction block 104 is addressed as a function of engine speed signal $N_e$ and an indication of engine load such as the accelerator pedal position signal AP. Then, the instruction block 106 is executed to call the EGR subroutine depicted in FIG. 4 for determining and outputting an EGR signal on line 26 for controlling the operation of the EGR valve 24. The instruction block 108 represents other engine control functions performed by the control unit 44, such as temperature and altitude compensation, idle control, and the development of spill valve closure signal (SC) on line 77 if appropriate. Upon executing such other engine control functions, the instruction block 102 is reexecuted to read fresh values of the various inputs as indicated by the flow diagram return line 110.

Referring now to the EGR subroutine depicted in FIG. 4, the instruction block 112 represents program instructions for determining the desired air/fuel (A/F) ratio as a function of engine speed $N_e$ and the requested fuel amount. EGR is used primarily for exhaust emission control and the desired air/fuel ratio values are chosen for different combinations of engine speed and load to result in acceptable emission levels. Such data is compiled in much the same way as the fuel injection timing values described above. As also indicated at the instruction block 112, the scheduled air/fuel ratio may be modified by various parameters to account for changes in altitude and temperature. Based on the desired air/fuel ratio and the requested fuel quantity (determined as a function of the accelerator pedal position), the desired mass air DESAIR is then calculated as indicated at the instruction block 114. Then, as indicated at the instruction block 116, the desired air value DESAIR and the actual mass air flow ACTAIR determined from the mass air flow signal AF on line 54 are differenced to determine the air flow error. Based on the error, a pulse-width-modulation signal for the EGR valve 24 is then determined as indicated at instruction block 118 for causing the actual air flow through the intake manifold 16 to correspond with the desired mass air flow DESAIR. If the error determined at instruction block 116 indicates that the actual mass air flow is too high, for example, the EGR pulse-width-modulation signal is altered to increase the amount of exhaust gases returned to the intake manifold 16, thereby effectively displacing some of the atmospheric air therein. Conversely, if the actual mass air flow is too low, the pulse-width-modulation signal for the EGR 24 is adjusted to lessen the amount of exhaust gas returned to the intake manifold 16.

In steady state engine operation, the EGR pulse-width-modulation adjustments are made in the manner described above to maintain the actual air/fuel ratio at or about the desired air/fuel ratio for emission controls. However, during transient engine operation, the actual air/fuel ratio typically changes by a large amount, thereby causing the control unit 44 to fully open or fully close the EGR valve 24. In an acceleration, for example, the actual air/fuel ratio suddenly drops causing the desired air DESAIR to greatly exceed the actual air ACTAIR. At such point, the EGR pulse-width is adjusted to fully close the EGR valve 24 and the valve 24 remains closed until substantially steady state engine operation is resumed. As will be described later, the control functions of this invention interact with the operation of the EGR valve according to the illustrated embodiment to provide a reduction of the exhaust emissions when such reduction is most needed—upon substantial closure of the EGR valve 24 in the course of an acceleration.

Figure 5B:
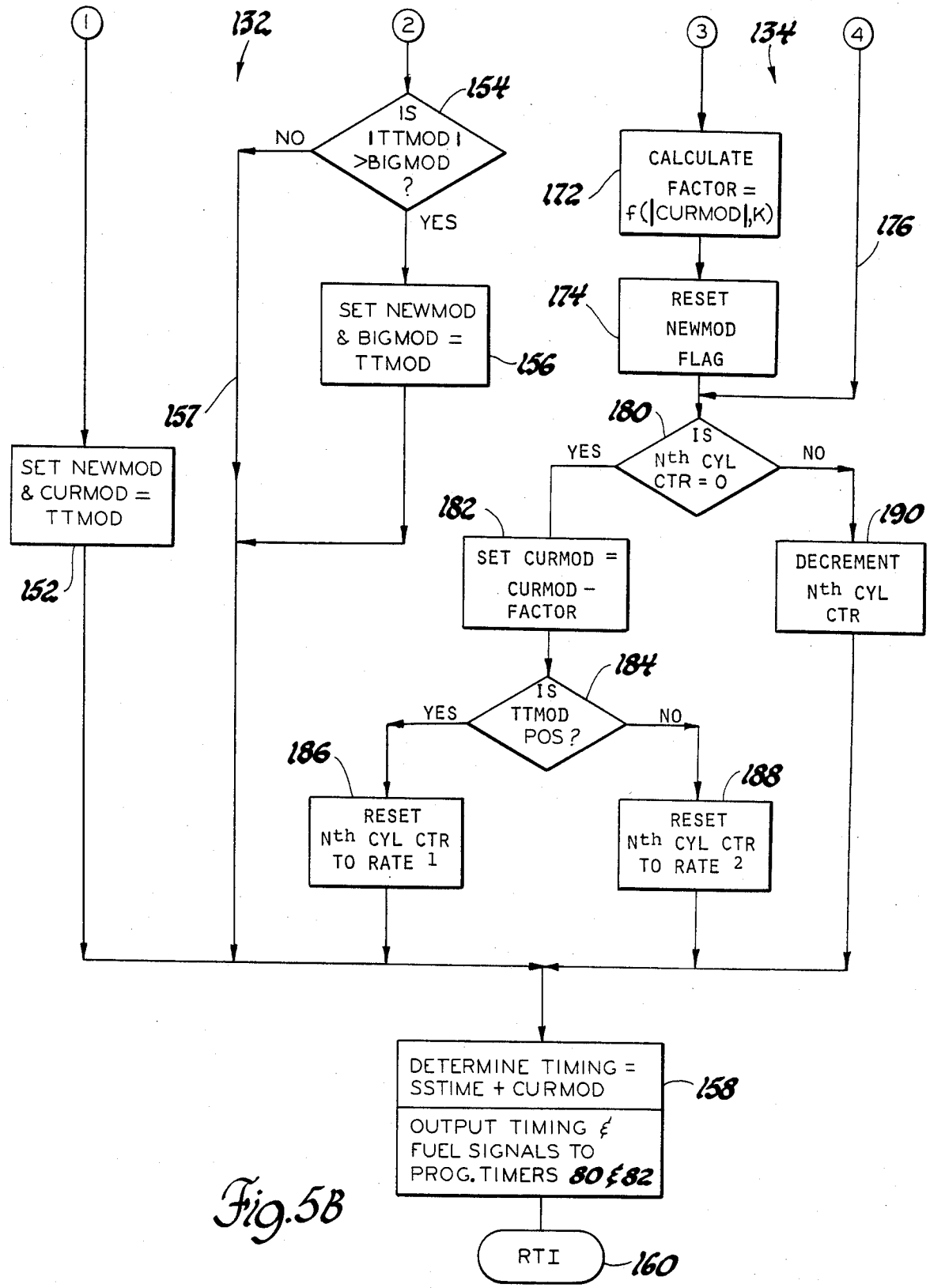

FIGS. 5A and 5B depict the flow diagram of an interrupt routine executed by the control unit 44 at each occurrence of top dead center in engine 12. Thus, if the engine 12 has eight cylinders, the routine depicted in FIGS. 5A and 5B will be executed by the control unit 44 four times per engine revolution. As indicated above, the information concerning the occurrence of each top dead center in engine 12 is obtained from the engine speed/crank position signal on line 52. Essentially, the routine depicted in FIGS. 5A and 5B performs two functions: updating the value of the timing correction amount based on the computed change in requested fuel amount, and outputting new TIMING and FUEL signals to the programmable timers 80 and 82.

Initially, the instruction block 120 is executed to output a TDC signal on line 72 for initializing the programmable timers 80 and 82 for the next injection of fuel. Then as indicated at instruction block 122, the requested fuel quantity is determined as a function of the accelerator pedal position AP and engine speed $N_e$. Then as indicated at instruction block 124, the cylinder-to-cylinder change in fuel (Δ fuel) is calculated according to the difference between the fuel quantity determined at instruction block 122 (NEW FUEL) and the previously determined fuel quantity (OLD FUEL). In addition, the term OLD FUEL is set equal to the term NEW FUEL so that in the next execution of the routine, the cylinder-to-cylinder change in fuel quantity may be accurately computed.

The decision blocks 126–130 are then executed to determine if the timing correction amount should be updated. If so the flow diagram branch designated generally by the reference numeral 132 is executed; if not, the flow diagram branch designated generally by the reference numeral 134 is executed. At decision block 126, the accelerator pedal position and engine speed/crank position signals are tested to determine if the engine 12 is at idle. If so, the engine 12 is at or near steady state operation regardless of the cylinder-to-cylinder change in requested fuel amount, and the flow diagram branch 134 is executed as indicated by the flow lines 136 and 138. If not, the decision block 128 is executed to determine if the change in fuel quantity ($\Delta$ fuel) is greater than a reference change ($\Delta_{ref}$) above which transient engine operation is indicated. In the illustrated embodiment, the reference $\Delta_{ref}$ is set at approximately 1.2 mm$^3$ as indicated in FIG. 2. If the computed change in fuel is less than or equal to the reference, the engine 12 is at or near steady state operation, and the flow diagram branch 134 is executed as indicated by the flow line 138. If the computed change in requested fuel is greater than the reference, the decision block 130 is executed to determine if the engine speed $N_e$ is in the control range. As indicated above, this invention recognizes that the changes in the cylinder combustion chamber conditions, and hence the duration of transient engine operation, decreases with increasing engine firing frequency. As a result, there is an engine speed $N_e$ above which transient corrections to the injection timing value SSTIME cannot be effectively made and may not be beneficial to engine operation. In the illustrated embodiment, it has been found that the effective control range extends from engine idle speeds to approximately 2200 rpm. If the engine speed $N_e$ is not within the control range, the flow diagram branch 134 is executed; if the engine speed $N_e$ is within the control range, the flow diagram branch 132 is executed to update the correction value. Thus, the flow diagram branch 132 is executed at the initiation of a period of transient engine operation and continues to be executed so long as the transient condition persists. When further adjustment of the correction amount is inappropriate, or the change in requested fuel amount indicates a return to substantially steady state engine operation, the flow diagram branch 134 is executed to reduce the previously developed correction amount at a controlled rate.

Three program variables TTMOD, NEWMOD and BIGMOD are used in the updating of the correction amount CURMOD. TTMOD represents the initial correction amount as determined from a look-up table such as represented by the trace 90 in FIG. 2. The terms NEWMOD and BIGMOD are used in the case of a timing retard as will be explained below to identify the proper retard value and to delay the initiation of the retard until the EGR valve is substantially closed.

Referring firstly to the flow diagram branch 132, the instruction block 146 is executed to set the NEWMOD flag, indicating that a modification of the correction amount is being made. Then, the instruction block 148 is executed to look-up a transient timing modification TTMOD as a function of the change in requested fuel amount $\Delta$ fuel as indicated by the trace 90 in FIG. 2. The decision block 150 is then executed to determine if the modification TTMOD is positive in sign indicating an injection timing advance, or negative in sign indicating an injection timing retard. If the modification TTMOD is positive, the instruction block 152 is executed as indicated by the circled numeral 1 to set the program variables CURMOD and NEWMOD equal to the new timing correction value TTMOD so that a modification of the steady state timing value SSTIME can be made without delay. If the correction amount TTMOD is negative in sign, the decision block 154 is executed as indicated by the circled numeral 2 to determine if the magnitude of TTMOD is greater than the term BIGMOD. If so, the terms NEWMOD and BIGMOD are set equal to TTMOD as indicated at the instruction block 156. If the magnitude of TTMOD is less than or equal to the term BIGMOD, the execution of instruction block 156 is skipped, as indicated by the flow diagram line 157. As mentioned above, retarding of the injection timing due to a sensed transient engine operation is delayed until it is determined that the EGR valve 24 is substantially closed; until such time, the program variable NEWMOD saves the desired correction amount as determined at decision block 154.

Following the execution of the flow diagram branch 132, the instruction block 158 is executed to determine a TIMING signal according to the sum of the steady state timing value SSTIME and the correction amount CURMOD. In addition, the TIMING and FUEL signals are outputted to the latches of programmable timers 80 and 82. At such point, execution of the interrupt routine is complete and the control unit 44 is returned to continue execution of the main program depicted in FIG. 3.

Referring now to the interrupt routine flow diagram branch 134, the decision block 162 is executed to determine if the NEWMOD flag is set. If so, this is the first execution of the flow diagram branch (i.e., a new modification NEWMOD of the correction amount has just been made), and the decision block 164 is executed to determine if the current transient timing modifier TTMOD is positive in sign. If not, a retardation of the injection timing is in order and the decision block 166 is executed to determine if the EGR valve 24 is substantially closed. As indicated above, this decision is made in the illustrated embodiment by a switch internal to the EGR valve 24 which closes upon substantial closure of the valve 24. If the EGR valve 24 is closed, the instruction block 168 is executed to set the correction amount CURMOD equal to the term NEWMOD so as to effect the timing correction without further delay, and to reset the term BIGMOD to zero. If it is determined at the decision block 164 that the transient timing modifier TTMOD is positive in sign, an advance of the injection timing has already been initiated, and the execution of the decision block 166 and the instruction block 168 is skipped as indicated by the flow line 170. Then, as indicated by the circled numeral 3, the instruction blocks 172 and 174 are executed to calculate a reduction factor FACTOR for the correction amount CURMOD and to reset the NEWMOD flag. As indicated at the instruction block 172, the term FACTOR is determined as a function of the correction magnitude and a constant K. If it is determined at the decision block 166 that the EGR valve has not yet closed, the execution of the instruction blocks 168, 172 and 174 is skipped as indicated by the flow line 176. If it is determined at the decision block 162 that the NEWMOD flag is not set, the execution of the blocks 164–174 is skipped as indicated by the flow lines 178 and 176 and the circled numeral 4.

According to the illustrated embodiment, a reduction of the correction amount CURMOD is made on a periodic basis in synchronism with the engine rotation by reducing the correction amount CURMOD by the term FACTOR determined at instruction block 172 at every Nth execution of the TDC interrupt routine. The number N may be any integer greater than or equal to 1; in the preferred embodiment, N has a value of 8 in the case of an injection advance and 16 in the case of an injection retard. Accordingly, reductions of the correction amount CURMOD are made every second engine revolution in the case of an advance and every fourth engine revolution in the case of a retard. The rationale for the difference is that the beneficial effect of injection timing retardation in a light to moderate engine acceleration extends over a relatively large number of engine cylinder firings, while the beneficial effect of injection timing advance in heavy engine acceleration extends over a relatively short duration. As set forth in FIG. 5B, the reduction of the correction amount CURMOD is implemented with an Nth cylinder counter (Nth CYL CTR) which is used to count executions of the TDC interrupt routine. Initially, the counter has a value of zero and the decision block 180 is answered in the affirmative. At such point, the instruction block 182 is executed to effect a reduction of the correction amount CURMOD by subtracting the term FACTOR from the correction amount CURMOD. Then, the decision block 184 and the instruction blocks 186 and 188 are executed to reset the Nth cylinder counter to a predetermined setting. If the sign of current transient timing modifier TTMOD indicates an injection timing advance, the decision block 184 is answered in the affirmative, and the instruction block 186 is executed to reset the counter to 8 as indicated by the term RATE 1. If the sign of TTMOD indicates an injection timing retard, decision block 184 is answered in the negative, and the instruction block 188 is executed to reset the Nth cylinder counter to 16 as indicated by the term RATE 2. If it is determined at the decision block 180 that the Nth cylinder counter is not zero, the instruction block 190 is executed to decrement the counter.

Figure 6:
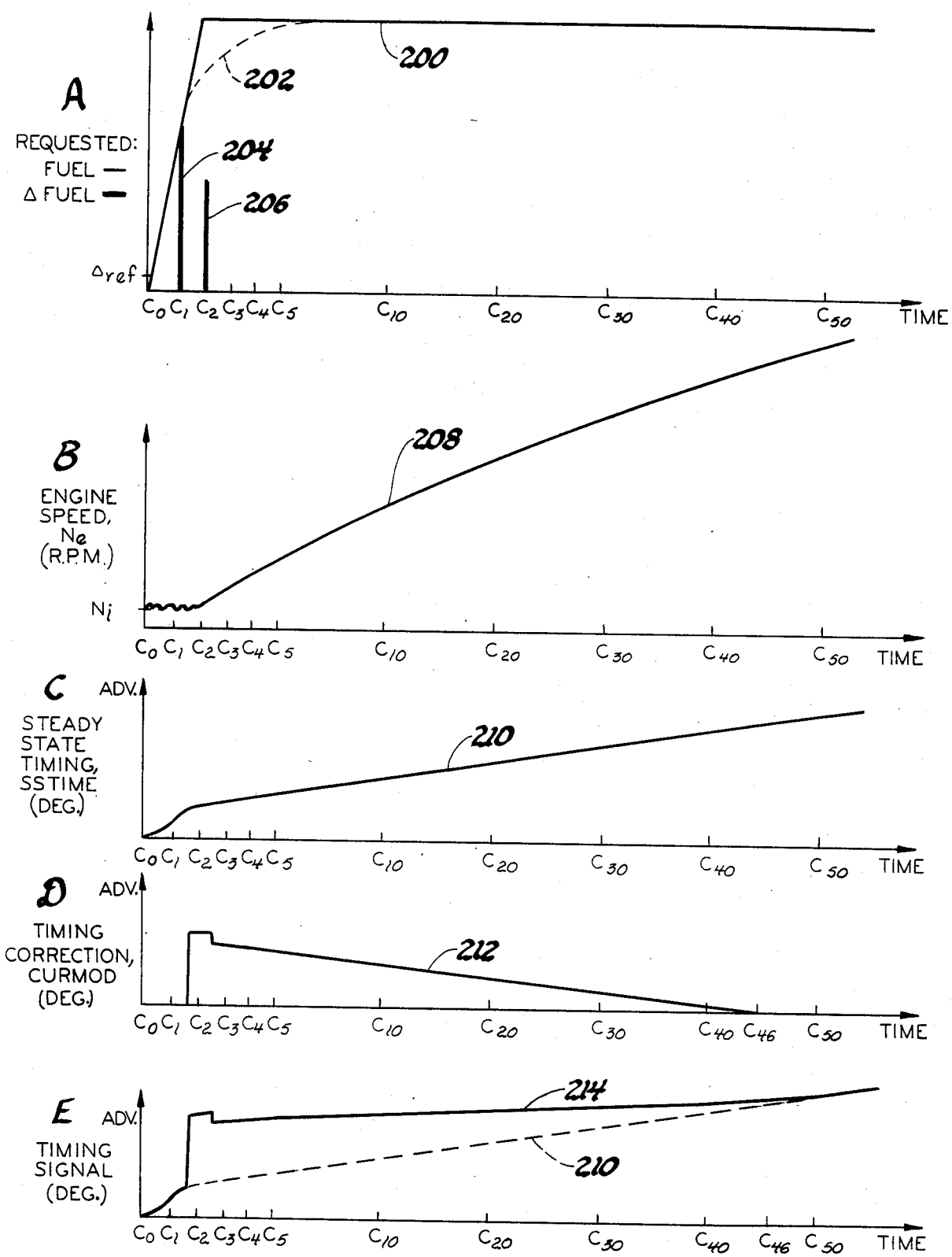
Figure 7:
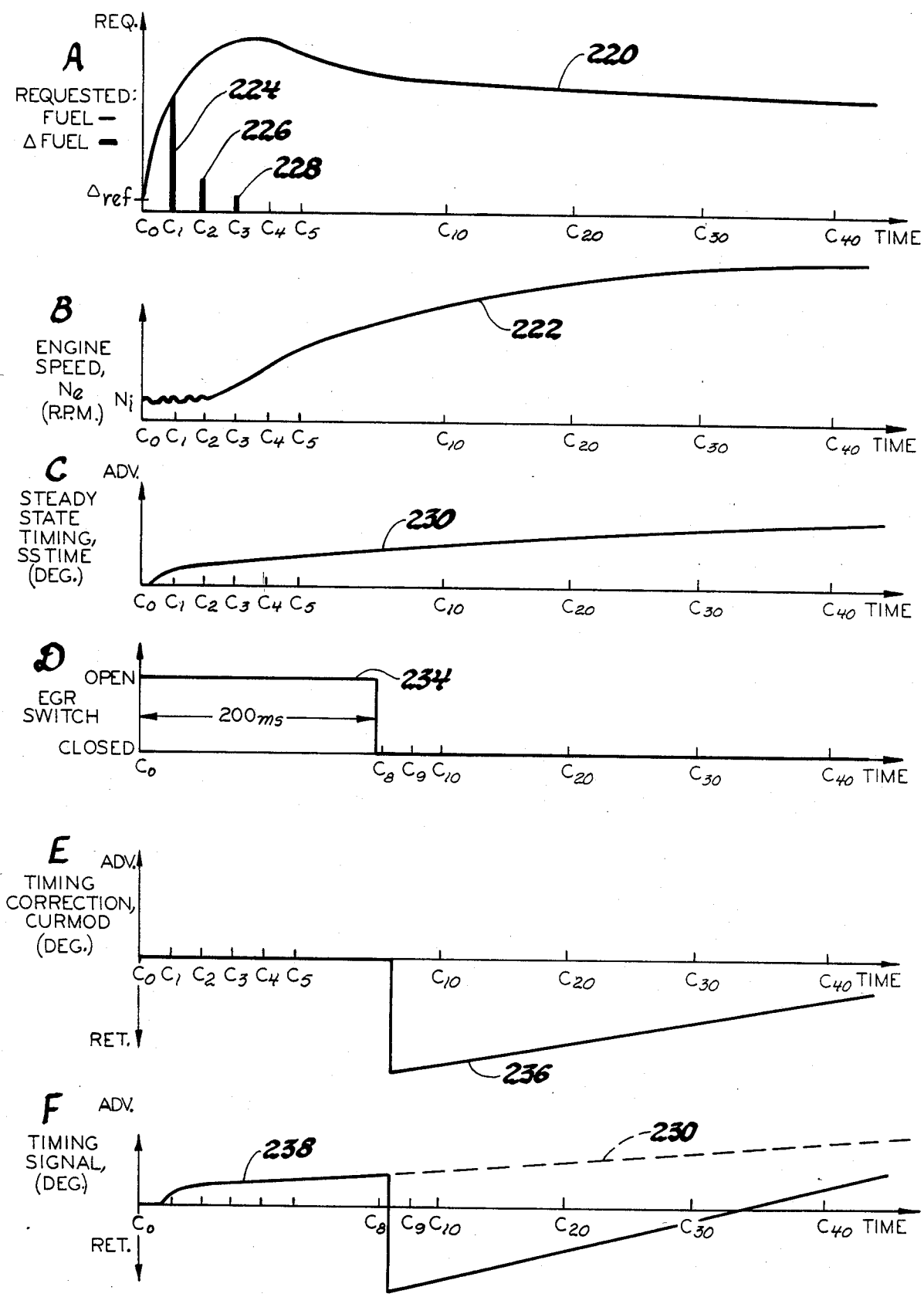

The operation of the control unit 44 in executing the program instructions depicted by the flow diagrams of FIGS. 3-5 will now be described in reference to the graphs of FIGS. 6 and 7. In each case, the various graphs are depicted on a common time base graduated in terms of engine cylinder too dead centers. Thus, the term $C_0$ represents the cylinder top dead center (TDC) which occurs at the beginning of a change in operator demand; the term $C_1$ represents the next engine cylinder TDC, and so on. In FIG. 6, the change in operator demand is representative of heavy engine acceleration demand; in FIG. 7, the change in operator demand is representative of light to moderate engine acceleration demand. In each case, the graphs depict requested fuel, change in requested fuel, engine speed, SSTIME, CURMOD, and the TIMING signal. In FIG. 7, an additional graph (Graph D) depicts the EGR valve closure signal.

Referring now more particularly to FIG. 6, the trace 200 of Graph A represents the requested fuel amount with respect to time for a wide-open throttle engine acceleration beginning at the cylinder TDC designated by $C_0$. Although the rate of increase of fuel actually delivered to the engine 12 may be modified somewhat by a fuel limiting device, as designated by the dashed line 202, the timing correction amount of this invention is based, as explained above, on changes in the requested fuel amount. Changes in the requested fuel amount determined by the TDC interrupt routine of FIGS. 5A and 5B at the times of cylinder TDCs $C_1$ and $C_2$ are graphically depicted by the heavy traces 204 and 206, respectively. At cylinder TDC $C_3$ and thereafter, the change in requested fuel amount is zero or negligibly small. As seen by the trace 208 of Graph B, the eventual delivery of the requested fuel to the engine cylinders results in a sharp engine speed increase from the idle value $N_i$.

The Graphs C, D, and E of FIG. 6 depict injection timing values in degrees of crank angle advance with respect to cylinder TDC position. In Graph C, the trace 210 depicts the injection timing values obtained from the empirically derived steady state timing schedule as a function of the engine speed $N_e$ and load AP as described above in reference to the main program of FIG. 3. In Graph D, the trace 212 depicts the values of the timing correction amount CURMOD derived in the course of the acceleration. In Graph E, the trace 214 depicts the sum of the steady state timing trace 210 and the timing correction amount trace 212, and therefore represents the TIMING signal outputted by the control unit 44. The trace 210 is repeated in broken lines in Graph E to show the convergence of the steady state timing value SSTIME and the outputted TIMING signal as the correction amount CURMOD is reduced to zero following a return of the engine 12 to substantially steady state operating conditions. The value of the term SSTIME is determined at a relatively high rate by the main program of FIG. 3, and is therefore depicted by a smooth trace in Graph C. On the other hand, the term CURMOD and the TIMING signal are updated only during execution of the TDC interrupt routine of FIGS. 5A and 5B; hence the discontinuous form of the traces 212 and 214 in Graphs D and E.

When the engine crankshaft passes through the TDC position $C_0$, the control unit 44 executes the TDC interrupt routine of FIGS. 5A and 5B to issue a TDC signal on line 72 to load the counters of programmable timers 80 and 82 with TIMING and FUEL signals for the next firing event ($C_1$). Since the change in fuel quantity is less than the reference ($\Delta_{ref}$), the timing correction amount CURMOD remains at its initialized value of zero (as seen in Graph D), and new TIMING and FUEL signals for the following firing event ($C_2$) are outputted to the latches of the programmable timers 80 and 82. At the TDC position $C_1$, the control unit 44 reexecutes the TDC interrupt routine to issue another TDC signal on line 72 to load the counters of programmable timers 80 and 82 with TIMING and FUEL signals for the next firing event ($C_2$), to update the value of CURMOD (trace 212) in accordance with the sensed change in requested fuel amount (trace 204), and to output new TIMING (trace 214) and FUEL signals for the following firing event ($C_3$). Thus, at each TDC position ($C_n$) the counters of programmable timers 80 and 82 are loaded with TIMING and FUEL signals for the next firing event ($C_{n+1}$) the value of CURMOD is updated in accordance with the sensed change in requested fuel amount, if any, and new TIMING and FUEL signals are outputted for the following firing event ($C_{n+2}$). However, at TDC position ($C_3$) and thereafter, the change in requested fuel quantity is less than the reference $\Delta_{ref}$, and the flow diagram branch 134 is executed to progressively reduce the timing correction amount CURMOD to zero. As set forth in FIGS. 5B, the term FACTOR is determined in the first execution of the flow diagram branch 134—at the cylinder TDC position ($C_3$) for the example illustrated in FIG. 6. After the timing correction amount CURMOD is reduced to zero (as depicted by the joining of the traces 210 and 214 in graph E), at or about the cylinder TDC position ($C_{46}$), the TIMING signal outputted to the latch of programmable timer 80 is once again determined solely in accordance with the steady state timing values SSTIME obtained from the empirically derived steady state timing schedule.

Referring now more particularly to FIG. 7, the trace 220 of Graph A depicts the requested fuel amount with respect to time for a light to moderate acceleration of the engine 12. The trace 222 of Graph B depicts the corresponding increase in engine speed $N_e$ from an idle value $N_i$. The changes in requested fuel amount ($\Delta$ fuel) determined by successive executions of the TDC interrupt routine at the TDC positions $C_1$, $C_2$ and $C_3$ are given by the heavy traces 224, 226 and 228, respectively. As shown in Graph D, the EGR valve 24 is open for returning exhaust gases from the exhaust pipe 22 to the engine intake manifold 16 at the initiation of the engine transient at the time of TDC position $C_0$. Due to the sudden change in fuel quantity, the control unit 44 operates to close the EGR valve as described above in reference to FIG. 4 in order to maintain the desired air/fuel ratio. As indicated in Graph D, such closure requires an interval of approximately 200 milliseconds. Retardation of the steady state timing amount due to a sensed engine transient is delayed until substantial closure of the EGR valve 24 so as to effect an improvement in the engine exhaust emissions when it is most needed. While the retardation could be effected immediately (as with injection advances) to effect a more immediate reduction of the engine exhaust emissions, such retard would cause a corresponding decrease in fuel economy as well. The correction amount applied upon closure of the EGR valve 24 is based on the largest value of TTMOD determined during the delay period prior to the return to substantially steady state engine operation. The largest retardation modifier TTMOD is determined with the term BIGMOD at the decision block 154 and the instruction block 156. The largest modifier is used because it provides a better indication of the extent of the light to moderate acceleration transient than smaller modifiers which occur a few cylinders later. For the period of operation depicted by the traces of FIG. 7, the correction amount would be based on the change in fuel quantity depicted by the trace 224 and determined at the time of TDC position $C_1$. Prior to the closure of the EGR valve 24 just prior to the TDC position $C_8$, the TIMING signals outputted by the control unit 44 are in accordance with the empirically derived steady state timing schedule as depicted by the trace 238 of Graph F.

As described above in reference to FIGS. 5A and 5B, the timing correction amount to be introduced upon substantial closure of the EGR valve 24 is stored by the term NEWMOD. When the TDC interrupt routine is executed at the TDC position $C_8$, the correction amount stored in the term NEWMOD is transferred to the term CURMOD (Graph E), the reduction term FACTOR is computed as a function of the correction amount magnitude, and updated TIMING (Graph F) and FUEL signals are outputted to the latches of programmable timers 80 and 82 for the upcoming firing event ($C_{10}$). Also, as set forth in reference to the example of FIG. 6, the execution of the TDC interrupt at each TDC position $C_n$ operates to load the counters of programmable timers 80 and 82 with TIMING and FUEL signals for the next firing event ($C_{n+1}$). Further executions of the TDC interrupt routine at the TDC positions $C_9$ and thereafter, operate to progressively reduce the timing correction amount CURMOD as seen in the Graphs E and F. After the term CURMOD is reduced to zero at or about the cylinder TDC position $C_{65}$ (not shown), the TIMING signal outputted to the latch of programmable timer 80 is determined solely in accordance with the steady state timing values SSTIME obtained from the empirically derived steady state tixing schedule.

The atove examples of FIGS. 6 and 7 illustrate the diverse operation of the timing control of this invention in periods of transient engine operation. In the usual situation, the transient operation will be characterized as light to moderate and the transient timing correction of this invention serves to retard the timing in respect to that obtained from the steady state timing schedule (at least following closure of the EGR valve) to effect a reduction in the level of engine noise and exhaust qas emissions. Such operation generally occurs at relatively low engine speed and the correction amount is phased out or reduced over a relatively long period of time. However, when a period of heavy acceleration is demanded by the operator of the vehicle, engine performance considerations take precedence and the injection timing is immediately advanced to offset the injection retard which is normally experienced, to thereby improve the engine performance. Such operation is normally followed by relatively high engine speed and the timing correction is phased out or reduced over a relatively short time interval. In implementing the present invention in a diesel engine fuel control system in a motor vehicle, the engine performance under heavy demanded engine acceleration was increased, and the engine noise and certain exhaust emission constituents under light to moderate demanded engine acceleration were reduced.

While this invention has been described in reference to the illustrated embodiment, it will be understood that this invention is not meant to be limited thereto. For example, the timing modifications depicted by the trace 90 in FIG. 2 may be varied to suit the particular engine or family of engines for which the timing control functions of this invention are being implemented. In addition, and as mentioned above, the retardation of injection timing with light to moderate engine acceleration may be implemented immediately without regard to closure of the EGR valve. Alternately, the implementation of the retard may be delayed for a predetermined period of time sufficient to ensure at least partial closure of the EGR valve 24, thereby eliminating the need for separately sensing closure of the valve. Likewise, the various constants and timing modifications referred to in the description of the illustrated embodiment may be altered when the control is applied to a different family of engines. These and other modifications will occur to those skilled in the art and systems incorporating such modifications may fall within the scope of this invention which is defined by the appended claims.

The embodiments of the invention in which an exclusive property or privilege is claimed are defined as follows:

1. A method of fuel supply to a diesel engine combustion chamber, where the engine usage is characterized by periods of substantially steady state operation during which the combustion chamber conditions are in a substantially stabilized state, and periods of transient operation therebetween during which the combustion chamber conditions are unstabilized and changing toward a new stabilized state at a rate proportional to the cylinder firing frequency, the method comprising the steps of:

providing fuel and timing values for each cylinder firing, the fuel value being indicative of the desired fuel quantity based on operator demand and the timing value being indicative of the optimum initiation of fuel supply based on a schedule of values compiled during testing under substantially steady state engine operation;

sensing the change in the fuel value from a previous cylinder firing as an indication of the extent to which the demanded engine operation deviates from steady state engine operation;

modifying the scheduled timing value by a correction amount determined in relation to the sensed change in fuel value when a significant deviation from steady state engine operation is indicated, which correction amount accounts at least in part for differences between the optimum timing value and the scheduled timing value due to the unstabilized combustion chamber conditions associated with the indicated deviation;

updating the correction amount at the cylinder firing frequency so long as the sensed change in fuel value indicates a significant deviation from steady state engine operation; and reducing the correction amount at a rate determined in relation to the cylinder firing frequency when the sensed change in fuel value indicates a return to substantially steady state engine operation.

2. For a diesel engine fuel injection control system where the injection of fuel for a respective engine cylinder is (1) initiated relative to a prior identifiable engine event in accordance with a timing value empirically determined during engine testing under substantially stabilized steady state engine combustion chamber conditions and (2) subsequently terminated relative to such initiation in accordance with a fuel value based on operator demand, a method of correcting such steady state determined timing value during periods of engine acceleration when the engine combustion chamber conditions deviate from substantially stabilized steady state values, the method comprising the steps of:

sensing the change in fuel value for each injection relative to the fuel value for a previous injection as an indication of the extent to which the demanded engine operation deviates from steady state engine operation;

modifying the empirically determined timing value by a correction amount determined in relation to the sensed change in fuel value when a significant deviation from steady state engine operation is indicated, the correction amount being effective when the sensed change in fuel value falls in a first range of values indicative of light to moderate engine acceleration for retarding the initiation of fuel injection relative to the initiation defined by the empirically determined timing value, and when the sensed change in fuel value falls in a second range of values indicative of heavy engine acceleration for advancing the initiation of fuel injection relative to the initiation defined by the empirically determined timing value, thereby to effect a reduction in the levels of engine noise and exhaust emissions in light to moderate engine acceleration and to effect an improvement in the engine performance during heavy accelerating;

revising the correction amount in synchronism with engine rotation so long as the sensed change in fuel value indicates a significant deviation from steady state engine operation; and reducing the correction amount at a rate determined in relation to the engine speed of rotation and the correction magnitude when the sensed change in fuel value indicates a return to substantially steady state engine operation.

3. The method as set forth in claim 2 wherein an exhaust gas recirculation mechanism returns a controlled portion of the engine exhaust gases to the engine cylinders to bring the engine air/fuel ratio into correspondence with a desired ratio for effecting a reduction of certain exhaust gas emissions, and wherein the timing modification normally effected by said control system during light to moderate engine acceleration is delayed until the return of exhaust gases to the engine cylinders by said exhaust gas recirculation mechanism is at least partially cut off, whereby the exhaust emissions reduction effected by said timing modification is delayed until the exhaust emission reduction effected by said exhaust gas recirculation mechanism is minimized.

4. A method as set forth in claim 2 wherein the reduction of the correction amount following a return to substantially steady state engine operation is further determined in relation to the correction amount direction, such that correction amounts which effect a retardation of the initiation of fuel injection are reduced at a relatively slow rate while correction amounts which effect an advance of the initiation of fuel injection are reduced at a relatively fast rate.

5. A fuel injection system for a multiple cylinder diesel engine comprising:

injection means for initiating the injection of fuel for individual engine cylinders in relation to the prior passage of a respective engine piston through a dead center position in accordance with a timing value and subsequently terminating such injection relative to the initiation in accordance with a fuel value; and control means for determining timing and fuel values for said injection means as a function of operator demand and sensed engine operating conditions, such control means including means effective upon passage of each engine piston through a dead center position for determining a fuel value in relation to operator demand;

sensing the change in fuel value from a previously determined fuel value;

determining a correction amount for an empirically derived timing value compiled under substantially stabilized steady state engine combustion chamber conditions when the sensed change in fuel value indicates a significant deviation from steady state engine operation, such correction amount accounting at least in part for differences between the optimum timing value and the compiled timing value due to the unstabilized combustion chamber conditions associated with the indicated deviation; and reducing the correction amount at a rate determined in relation to the correction magnitude when the sensed change in fuel value indicates a return to substantially steady state engine operation.

6. A fuel injection system as set forth in claim 5 wherein the correction amount is effective when the sensed change in fuel value falls in a first range of values indicative of light to moderate engine acceleration for retarding the initiation of fuel injection relative to the initiation of fuel injection that would be obtained with the steady state determined timing value, and when the sensed change in fuel value falls in a second range of values indicative of heavy engine acceleration for advancing the initiation of fuel injection relative to the initiation of fuel injection that would be obtained with the steady state determined timing value.

7. A fuel injection system as set forth in in claim 6 wherein reductions of the correction amount upon return to substantially steady state engine operation are inhibited for a first predetermined number of fuel injections following a period of light to moderate engine acceleration and for a second predetermined number of fuel injections following a period of heavy engine acceleration, such first predetermined number being greater than said second predetermined number so that the reduction of the injection retard following a period light to moderate engine acceleration is effected over a relatively long period of time as compared to the reduction of the injection advance following a period of heavy engine acceleration.

* * * * *